Dec. 13, 1960   A. R. CUNNINGHAM   2,963,841
CROP CONDITIONER
Filed May 2, 1958   2 Sheets-Sheet 1

INVENTOR.
A.R. CUNNINGHAM

Dec. 13, 1960     A. R. CUNNINGHAM     2,963,841
CROP CONDITIONER
Filed May 2, 1958     2 Sheets-Sheet 2
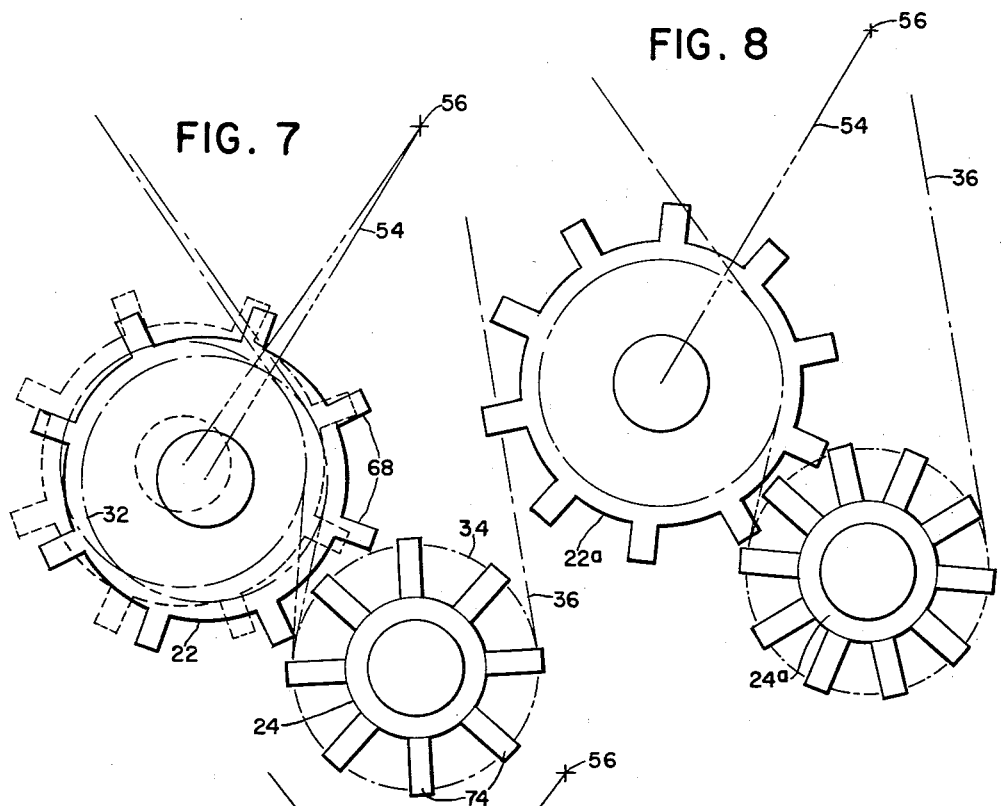
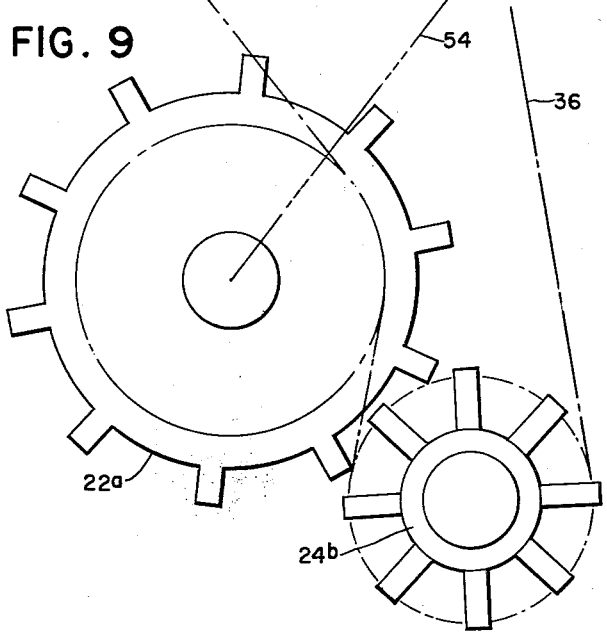
INVENTOR.
A. R. CUNNINGHAM

2,963,841
CROP CONDITIONER

Arthur R. Cunningham, Chicago, Ill., assignor to Cunningham & Sons, Chicago, Ill., a partnership Filed May 2, 1958, Ser. No. 732,489

5 Claims. (Cl. 56—1)

This invention relates to a crop conditioner and more particularly to an improved machine having meshing rolls operative to condition the crop in such manner as to promote the curing thereof by accelerating release of moisture from the stems whereby the stems and leaves will cure in approximately the same time.

The principal prior art exemplification of a machine of the character referred to above forms the subject matter of the U.S. patent to Cunningham 2,711,622, which features the provision of a pair of parallel fluted or bladed rolls between which crops are fed from a swath constituted by previously harvested crops lying in the field on its own stubble. The machine is wheel-supported, and the cooperative rolls establish a bite which faces downwardly and into which the toppings or crops are drawn as the machine advances. As the crops pass between the bladed or fluted rolls, the stems are stretched, cracked, etc., to accelerate the release of moisture therefrom, and the conditioned crops are discharged rearwardly and back onto the field. One of the features of that prior machine is the provision of the rolls in such manner that the pockets formed between neighboring flutes or blades on the rolls are of relatively large circumferential dimension as compared to the thickness of each blade or flute so that each pocket accommodates not only the meshing flute of the other roll but also the leaves, whereby the leaves are not substantially crushed, cracked, etc., the theory being that the greater proportion of moisture is contained in the stem and therefore it is desirable to treat only the stems and not the leaves. Otherwise, treated leaves would dry ahead of stems and considerable leaf loss would result because of shattering.

The present invention features a variation on the machine referred to above, primarily on the basis of positive means for driving the two rolls independently of the mesh of the flutes or blades thereof; that is, in the prior machine, only one roll is positively driven and the intermesh of the blades or flutes is depended upon to drive the other roll. According to the present invention, the two rolls are positively drivingly interconnected by means other than their blades or flutes and these mesh without substantial contact, resulting in much quieter operation. The present invention further features a multi-roll arrangement having at least a pair of rolls so designed and constructed and of such size relative to the numbers of flutes thereon that the ratio between their angular velocities differs from the ratio between the peripheral speeds measured at the tips of their blades or flutes. The arrangement is further such that the flutes having the higher peripheral speed have a special cooperative effect with the flutes and pockets of the other roll, whereby any given faster flute enters the pocket formed between neighboring flutes on the other roll in such manner that it approaches close contact with one of said neighboring flutes and travels across the pocket in a circumferential direction at such rate that when it leaves the pocket it approaches close contact with the second of said neighboring flutes. This arrangement facilitates the treatment of the stems so as to accommodate the desired curing characteristics and enables the use of rolls having relatively few blades which accomplish as much work as if not more work than, rolls of other designs having a greater number of flutes or blades.

It is a significant object of the invention to provide a roll arrangement in which the design of non-contacting interdigitating flutes enables selective movement of the rolls toward and away from each other without binding of the flutes, in respect of which object it is a subsidiary object to establish a novel positive drive, preferably of the chain and sprocket type, which has a definite combinative relation to the roll and flute characteristics in enabling the aforesaid movement of the rolls toward and away from each other.

It is a further feature of the invention to provide a drive means with adjustment means permitting timing of the mesh between the flutes or blades of the two rolls.

Since both rolls are positively driven, there will be less wrapping of the crops on the rolls, and thus the rolls are self-cleaning.

The foregoing and other important objects and desirable features inherent in and encompassed by the invention will appear as a disclosure is made of a preferred embodiment, by way of example, in the ensuing specification and accompanying sheets of drawings, the several figures of which are described below.

Fig. 7 is a diagrammatic enlarged view showing, in full lines, the interdigitated relation of the rolls and, in dotted lines, an out-of-mesh condition of the rolls.

Fig. 8 shows a pair of mating rolls in which the numbers of flutes are varied over those shown in Figs. 1–7.

Fig. 9 is a further variation in the roll arrangement.

Figure 1:
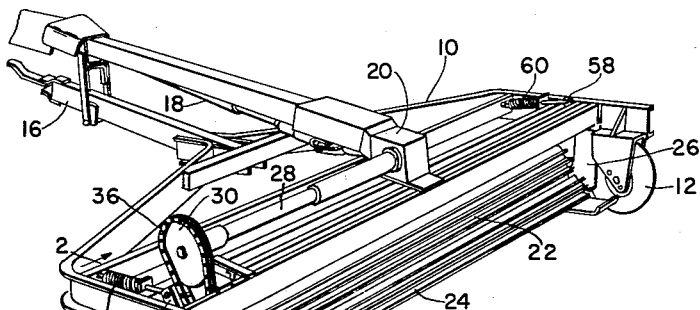
Fig. 1 is a perspective of a representative machine.

The machine chosen for purposes of illustration follows, in general overall appearance, that of the conditioner disclosed in the above-identified Cunningham patent, and to the extent embodies a main frame 10 carried on right and left hand wheels 12 and 14 which thus fix the frame at a predetermined height above the field over which the machine is caused to advance, as by being connected to a tractor or the like (not shown) through the medium of a draft tongue 16. The numeral 18 represents generally a propeller shaft having a typical connection to the power take-off shaft (not shown) of a tractor, all as is well understood. The propeller shaft operates through a suitable gear box 20 and other drive means to be presently described for driving a pair of crop-treating or crop-conditioning rolls, hereinafter identified as front and rear rolls or first and second rolls 22 and 24 respectively.

Figure 2:
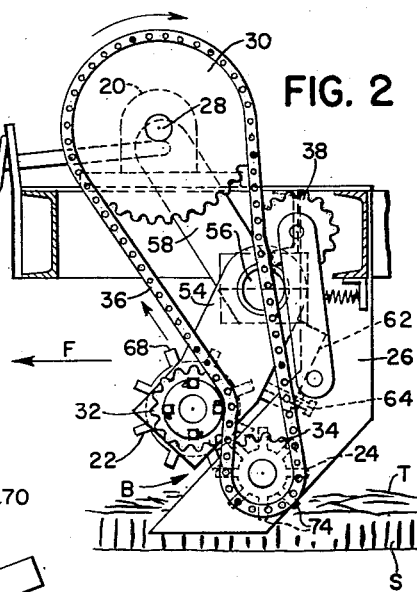
Fig. 2 is an enlarged section as seen generally on the line 2—2 of Fig. 1.

The rolls are preferably disposed with their axes parallel and transverse to the direction of advance of the machine, and the rear roll is journaled at its opposite ends in any appropriate manner in depending supports, one of which appears at 26 in Fig. 2. The front roll is journaled in a manner to be described later. The general theory of operation is that the machine is drawn over a field of previously harvested crops in which the crop toppings, including leaves and stems, form a layer supported by the stubble. A typical situation is illustrated generally in Fig. 2, the stubble being represented by the letter S and the toppings by the letter T. The letter F indicates the direction of advance. In the Cunningham patent mentioned above, another feature is the ability of the cooperating rolls to pick up the toppings from the stubble. A similar pattern is followed here; although, in its broadest sense the invention is not limited to the pick-up aspects of the rolls.

As will be readily seen, the front or first roll is of larger diameter than the second or rear roll. However, in the forms of the invention shown in Figs. 1–7 and 8 the rolls are driven at the same angular velocity, which is achieved by drive means including an output shaft 28 from the gear box 20, a large sprocket 30 on the shaft 28, and small sprockets or rotary drive members 32 and 34, respectively, coaxially keyed to the left-hand ends of the rolls 22 and 24, together with a drive chain 36 which is trained about the sprockets 30 and 34 and one run of which runs about the outside of the front roll sprocket 32. In other words, in the instances mentioned, the sprockets 32 and 34 have the same diameter and the arrangement of the chain is such that the sprockets 30 and 34 rotate in the same direction, but one run of the chain causes the sprocket 34 to rotate in the opposite direction but at the same speed as the sprocket 32. In a preferred example, as in Figs. 1–7, the chain is a conventional roller chain of ¾" pitch and each sprocket has sixteen teeth, or a pitch diameter of 3.82". As will be brought out below, the sizes of the sprockets are related to the sizes and other characteristics of the rolls 22 and 24. This means is a positive drive between the two rolls 32 and 34 independent of cooperation between the flutes or blades on the rolls, which will be subsequently described in detail.

Figure 3:
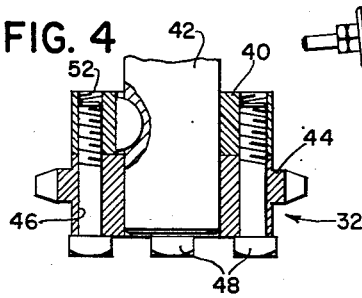
Fig. 3 is an elevational view of the adjustable drive member or sprocket.
Figure 4:
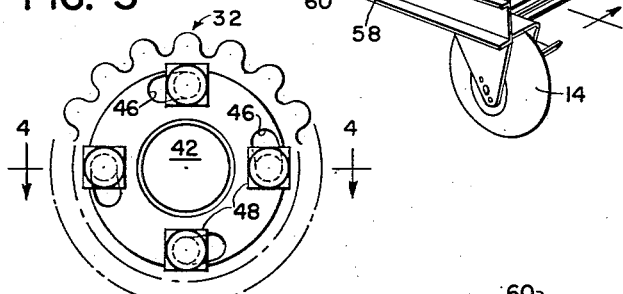
Fig. 4 is a section on the line 4—4 of Fig. 3.

A spring loaded idler 38 engages the rear run of the chain 36, which is the run opposite to the run that engages the sprocket 32. The sprocket 32 is further of special construction, as best shown in Figs. 3 and 4, and includes an inner part 40 keyed to a shaft 42 to which the roll 22 is also keyed, being thus coaxially fixed to the roll. The sprocket includes a second or outer part 44 which is toothed to agree with the teeth on the other sprocket 34, and this part 44 has therein a plurality of arcuate slots 46 for respectively receiving securing means such as cap screws 48 which are threaded respectively into tapped bores 52 in the inner sprocket part 40. When the cap screws 48 are loosened, the outer sprocket part 44 may be turned angularly within the limits of the slots 46 and thus the teeth on said outer part may be "timed" with the teeth on the front roll 22. Stated otherwise, and considering that the angular positions of the sprockets 32 and 34 are fixed by engagement thereof with the chain 36, the position of which is in turn fixed by engagement with the sprocket 30, the angular position of the roll 22 relative to the sprocket outer part 44 may be angularly adjusted. The same results would follow if the adjustable sprocket 32 were interchanged with the nonadjustable sprocket 34.

The foregoing pertains to one phase of adjustability of interdigitation between the flutes or blades on the rolls 22 and 24. Another phase is achieved by mounting the roll 22 at opposite ends in a movable support part 54 which is rigid on a transverse shaft 56. Arms 58 are rigidly secured to the shaft 56 and are spring loaded at 60 in such manner as to urge the roll 22 into mesh with the roll 24. Stops are provided for limiting the extent of movement of the rolls toward each other. A typical stop is shown in Fig. 2 as comprising a block 62 carrying an adjustable cap screw 64. The block may be rigid on the support part 26 so that the cap screw engages the movable support part 54. It will be seen that turning of the cap screw 64 in, assuming that it has a right hand thread, will project the cap screw through the block and thus will stop the position of the roll 22 farther from the roll 24.

The roll 22 is preferably made up of a central elongated hub part 66 from which a plurality of flutes or blades 68 radiate in uniformly circumferentially spaced relation. In the present instance, the roll 22 has an outside diameter of 5.6 inches and eight flutes 68, and each pair of neighboring flutes affords therebetween a pocket 70. On the basis of these dimensions, the flutes have a pitch or circumferential spacing of 2.2 inches, and each flute is relatively narrow—on the order of .375 inch so that the circumferential width of each pocket 70 is considerably greater than the circumferential thickness of each flute 68. Each pocket preferably has a depth on the order of .625–1.25 inches; although, these figures may be readily varied. The other roll 24 may be similarly constructed; although, as already described, its outside diameter is less than that of the roll 22, here 4.0" as compared with the 5.6" diameter of the roll 22. The roll 24 may have a central elongated hub part 72 from which radiate eight flutes 74, which is a number equal to the number of flutes 68 on the roll 22. These flutes may be likewise identical in circumferential and radial dimensions as respects the flutes 68, and neighboring flutes 72 afford therebetween relatively circumferentially wide pockets 76. Thus, the flutes on each roll are uniformly angularly spaced; although, because of the larger diameter of the roll 22 (here 5.6") the actual circumferential distance between the tips of the flutes 68 will be greater (here 2.2") than that between the tips of the flutes 74, which, on the basis of eight teeth on the 4" outside diameter of the roll 22, gives the flutes 74 a pitch of 1.58". Stated otherwise, the pitch of the flutes 68 (2.2") is here 40% greater than the pitch of the flutes 74, although, this variation can of course be altered to either side of the figure given as long the flute-to-diameter-to-speed relation produces the results herein set forth. For the same reasons, the circumferential dimension of each pocket 70 will be considerably greater than that of each pocket 76 in the smaller roll. Also, because the sprockets 32 and 34 are of the same size, the rolls are driven at the same angular velocity, but, because of the differences in roll diameters as just noted, the peripheral speed of the flutes 68 is greater than that of the flutes 74.

In the preferred example shown in Figs. 1–7, the diameters of the sprockets 32 and 34 should, other things being equal, be as near as possible to the diameters of the rolls 22 and 24 without actually engaging each other. As illustrated in Fig. 7, the pitch diameter of the sprocket 34 is shown as being equal to the outside diameter of the roll 24. Since the two sprockets must be equal in diameter, in this form of the invention, and since the rolls must have relative diameters on the order of those already given (5.6" for 22 and 4.0" for 24), again in this form of the invention, the above cannot be observed exactly, but the example shown in Fig. 7 does show that the sprockets are as large as feasible in the circumstances. Convenient formulae for appropriate designs of roll and sprocket relationships may be employed as follows:

Let
$t^1$=number of teeth in sprocket 34
$t^2$=number of teeth in sprocket 32
$d^1$=diameter of roll 24
$d^2$=diameter of roll 22
$p^1$=pitch of flutes in roll 24
$p^2$=pitch of flutes in roll 22
$f^1$=number of flutes in roll 24
$f^2$=number of flutes in roll 22

Then (1) $$p^2 = p^1 \times 1.40'' \text{ (approx.)}$$

(2) $$d^2 = \frac{d^1 \times 1.40'' \times f^2}{f^1}$$

(3) $$\frac{t^1 f^2}{f^1} = t^2$$

Applying the above to Figs. 1–7:

(1)   $2.2'' = 1.58'' \times 1.40''$ (approx.)

(2)   $5.6'' = \dfrac{4 \times 1.40'' \times 8}{8}$ (3)   $\dfrac{16 \times 8}{8} = 16$ The above relationship is significant not only in producing the crop-treating action to be described, but also enables separation and return of the rolls (Fig. 7) without clashing of the flutes, which would otherwise be occasioned were the rolls of both the same size and of the same number of flutes. That is to say, when the rolls are separated, the roll 22 and sprocket 32 swing about the pivot axis 56 and the sprocket 32 "walks" up the front run of the chain, causing the roll 22 to turn relative to the roll 24, but here there can be no binding of the flutes, which result is achieved by a combination of the flute-to-diameter-to-speed ratio as set forth plus the relatively narrow thicknesses of the flutes.

Figure 5:
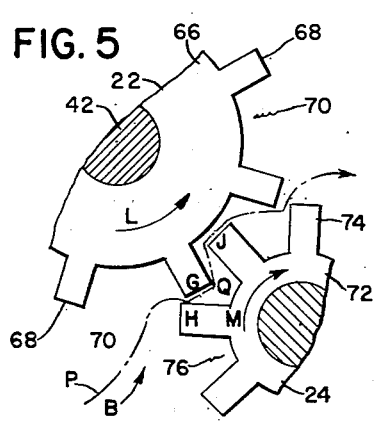
Fig. 5 is an enlarged fragmentary view showing the relationship of the interdigitating flutes as a given flute of one roll enters a mating pocket on the other roll.
Figure 6:
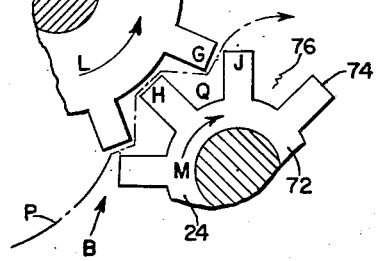
Fig. 6 is a similar view but illustrates the position of the given flute as it leaves said mating pocket.

The nature of the action on the toppings received in the bite between the rolls 22 and 24 will best be understood from the following explanation, taken in connection with Figs. 5 and 6. In these figures, the letter B designates generally the bite between the rolls, and the arrows L and M designate the directions of rotation of the rolls 22 and 24 respectively. The broken line running through the meshing flutes of the rolls and designated by the letter P represents schematically a stem of the plant toppings T being drawn through the rolls.

In the explanation of the action of the rolls, one flute on the large roll 22 will be selected as a given flute representative of the others, and its relationship to a pair of neighboring flutes on the small roll 24 will be described. For present purposes, the given flute will be identified by the letter G and the neighboring flutes on the small roll will be identified as H and J which define between them a pocket Q which mates with or receives the given flute G.

Fig. 5 illustrates the position of the flute G as it enters the pocket Q. As will be seen, it approaches close contact with the proximate face of the flute H, and tends to stretch the stem P into the pocket Q between the flutes H and J. Because of the approximation of contact between G and H, the stem P is scraped and stretched, and the stem is fractured so that release of moisture therefrom is accelerated. As the two rolls continue to rotate in their respective directions L and M, the stem P is drawn through the rolls and the given flute G travels circumferentially across the pocket Q at such rate that it leaves approximate contact with flute H and approaches approximate contact with flute J, inflicting a second fracturing action on the stem P, which is ultimately discharged rearwardly in the direction of the arrowhead on the dot dash line representing the stem. Thus, the stem is bent sharply by the flute G over the flute H and into the pocket Q, and, as subsequent flutes, corresponding to the flutes G, H and J are received in pockets corresponding to the pocket Q, the stems are continuously subjected to the action just noted. The correctly timed relationship between the rolls is maintained and the non-contacting flutes are received in their mating pockets without driving contact, driving being effected through the sprockets 32 and 34, via the chain 36, as already described. This takes the driving action away from the rolls and leaves the rolls to cooperate in the manner indicated, which is a function of their characteristics of having, in this instance, the same angular speed but different peripheral speeds.

The Fig. 8 variation of the roll arrangement is one in which the relative diameters of two rolls 22a and 24a and their sprockets (not shown) are retained by the number of flutes on each roll is increased to ten. The sprockets may be the same as those previously described at 32 and 34.

Since the roll 22a has an outside diameter of 5.6" (the same as roll 22) but has ten flutes, the flute pitch will be 1.77". The roll 24a has an outside diameter of 4.0" (the same as roll 24) and, having ten flutes, has a flute pitch of 1.26". Thus, using Formula 1 above, it is seen that $1.77'' = 1.26'' \times 1.40''$ (approx.).

Formula 2 shows that $$5.6 = \frac{4 \times 1.40'' \times 10}{10}$$

Formula 3 produces $$\frac{16 \times -10}{10} = 16$$

In Fig. 9, both roll diameter and flute number have been altered in a roll arrangement using rolls 22b and 24b. The roll 22b has an outside diameter of 7.0" and has ten flutes; the roll 24b has eight flutes and an outside diameter of 4.0". In view of the 7.0" diameter of roll 22b, the pitch of its ten flutes is 2.2", which is the same as that of the eight flutes on the 5.6" roll 22. Since the 4.0", eight flute roll 22b is the same as roll 22, its flute pitch is also 1.58. As shown before, $2.2'' = 1.58'' \times 1.40''$ (approx.).

Formula 2 produces:

$$7.0 = \frac{4'' \times 1.40'' \times 10}{8}$$

Formula 3 produces:

$$\frac{16 \times 10}{8} = 20$$

thus giving a 16-tooth sprocket for roll 22b and a 20-tooth sprocket for roll 24b.

The above, therefore, illustrates an example in which the principles of the invention may be exploited where both the peripheral and angular speeds of the rolls are different. However, the characteristics of Figs. 1–7 and the results obtainable thereby, remain the same.

It is not intended to limit the invention to the precise constructions disclosed but to embrace equivalent structures that fall within the spirit and scope of the invention.

What is claimed is:

1. Crop-treating apparatus of the class described, comprising: a supporting frame; means carrying the frame for advance over a field on which windrowed plant toppings form a layer supported on their own stubble; first and second rolls carried by the frame on parallel axes and having interdigitating flutes defining a bite at one side thereof, one of said rolls being disposed in adjacent relation to said layer and adapted to gather toppings from said layer, said rolls being journaled to rotate in opposite directions so that the flutes thereof move into the bite to cause toppings to enter the bite for deformation by the interdigitating flutes and for discharge at the opposite side of the rolls, the deformed toppings being deposited on the field by said rolls, the peripheral edges of the flutes of one of said rolls projecting radially a greater distance than the peripheral edges of the flutes of the other of said rolls; the flutes on each roll being relatively thin in circumferential dimension and projecting radially from and running lengthwise of the respective roll and being uniformly circumferentially spaced to provide relatively circumferentially wide toppings-receiving pockets between neighboring flutes on each roll for accommodating both the interdigitating flutes of the other roll and toppings received in the aforesaid bite; and means operatively associated with said rolls for positively driving each of said rolls about its axis, said rolls being driven in opposite directions, whereby the peripheral velocity of ends of the flutes of one roll exceeds that of the ends of the flutes of the other roll so that any given flute of said one roll enters and leaves the mating pocket defined by two neighboring flutes on said other roll without driving contact with either of said neighboring flutes.

2. The invention defined in claim 1, in which: the means for driving the rolls includes a pair of drivingly interconnected rotary drive members, one for each roll; a pair of means securing the drive members respectively coaxially to the rolls; and one of said securing means being adjustable to enable relative angular adjustment between one drive member and its roll whereby the mesh of said roll with the other roll may be angularly varied despite the driving interconnection of the drive members.

3. Crop-treating apparatus of the class described, comprising: a supporting frame; means carrying the frame for advance over a field on which previously harvested plant toppings form a layer supported on their own stubble; first and second rolls carried by the frame on parallel axes and having meshing flutes defining a bite at one side thereof for receiving toppings from said layer and said rolls being journaled to rotate in opposite directions so that the flutes thereof move into the bite to cause toppings to enter the bite for deformation by the meshing flutes and for discharge at the opposite side of the rolls; the flutes on each roll being relatively thin in circumferential dimension and projecting radially from and running lengthwise of the respective roll and being uniformly circumferentially spaced to provide relatively circumferentially wide toppings-receiving pockets between neighboring flutes on each roll for accommodating both the meshing flutes of the other roll and toppings received in the aforesaid bite; means other than the meshing teeth for positively driving the rolls about their respective axes and in their respective opposite directions and including a pair of roll sprockets, one keyed coaxially to each roll; a driven sprocket, and a chain trained about the driven sprocket and about one roll sprocket and having a run engaging the other roll sprocket so as to drive said other roll sprocket in the direction opposite said one roll sprocket; means mounting one roll on the frame for bodily movement selectively away from and toward the other whereby the flutes may be selectively disengaged and meshed, said movement causing said one roll sprocket to walk up or down said run and thus to turn said one roll relative to the other roll so that said one roll may be moved bodily away from and toward the other without clashing of the flutes thereof.

4. Crop-treating apparatus of the class described, comprising: a supporting frame; means carrying the frame for advance over a field on which previously harvested plant toppings form a layer supported on their own stubble; first and second rolls carried by the frame on parallel axes and having meshing flutes defining a bite at one side thereof for receiving toppings from said layer and said rolls being journaled to rotate in opposite directions so that the flutes thereof move into the bite to cause toppings to enter the bite for deformation by the meshing flutes and for discharge at the opposite side of the rolls; the flutes on each roll being relatively thin in circumferential dimension and projecting radially from and running lengthwise of the respective roll and being uniformly circumferentially spaced to provide relatively circumferentially wide toppings-receiving pockets between neighboring flutes on each roll for accommodating both the meshing flutes of the other roll and toppings received in the aforesaid bite; said rolls being of such outside diameters and having such numbers of flutes that the circumferential spacing of flutes on one roll is on the order of 40% greater than that of the other roll; means other than the meshing teeth for positively driving the rolls about their respective axes and in their respective opposite directions and including a pair of roll sprockets, one keyed coaxially to each roll; a driven sprocket, and a chain trained about the driven sprocket and about one roll sprocket and having a run engaging the other roll sprocket in the direction opposite said one roll sprocket; means mounting one roll on the frame for bodily movement selectively away from and toward each other whereby the flutes may be selectively disengaged and meshed, said movement causing said one roll sprocket to walk up or down said run and thus to turn said one roll relative to the other roll so that said one roll may be moved bodily away from and toward the other without clashing of the flutes thereof.

5. The invention defined in claim 1 in which the axes of said rolls are in vertically spaced relation, the axis of the lower of said rolls being disposed rearwardly of the axis of the upper roll as said frame is advanced.

References Cited in the file of this patent
UNITED STATES PATENTS

| | | |
|---|---|---|
| 2,442,520 | Van Sickle | June 1, 1948 |
| 2,711,622 | Cunningham | June 28, 1955 |
| 2,774,246 | Happe et al. | Dec. 18, 1956 |
| 2,811,819 | Heth | Nov. 5, 1957 |
| 2,908,126 | Dyrdahl | Oct. 13, 1959 |